UNITED STATES PATENT OFFICE.

HENRY A. HUGHES, OF CAMDEN, NEW JERSEY, ASSIGNOR OF TWO-THIRDS TO JAMES P. SCOTT AND GEORGE C. POTTS, BOTH OF PHILADELPHIA, PA.

PROCESS OF DEFECATING AND CLARIFYING SACCHARINE LIQUORS.

SPECIFICATION forming part of Letters Patent No. 281,188, dated July 10, 1883.

Application filed March 29, 1883. (Specimens.)

*To all whom it may concern:*

Be it known that I, HENRY A. HUGHES, of Camden, Camden county, New Jersey, have invented a new and useful Improvement in Processes of Defecating and Clarifying Saccharine Liquors, of which the following is a specification.

The object of the invention is to separate from the saccharine liquors all or the greater portion of the matters therein contained, except sugar and water, this process being commonly known in the art as "defecation" and "clarification." At the present time four general methods may be recognized for accomplishing this result, these methods depending, respectively, upon the application of heat, upon the use of chemicals, upon filtration, and upon galvanic or electrical action. My invention belongs mainly to the second class, inasmuch as the processes hereinafter described depend chiefly upon the employment of certain chemical agents.

The invention consists in a mixture of sulphurous-acid gas and cream of lime for treating the saccharine liquor. Said mixture I believe to be both chemical and mechanical, inasmuch as there is contained considerable free sulphurous-acid gas in the compound when in best condition for use; also, in the process of treating the saccharine liquor with said mixture in the manner set forth; also, in the process of treating the saccharine liquor, subsequent to the same being acted upon by the aforesaid mixture, with an aqueous solution of acid; also, in the process of treating the saccharine liquor with the aforesaid mixture and the dilute acid solution and filtering while cold; also, in the process of treating the saccharine liquor with the aforesaid mixture and the dilute acid solution, then heating, and finally filtering; also, in the process of delaying fermentation in the saccharine liquors by treatment with the aforesaid mixture and the dilute acid solution; and, also, in the process of removing the sulphurous taste in sugar defecated by the aforesaid or any other sulphur processes by injection of live steam.

The best means which I now know for practically operating the inventions hereinafter claimed and described is as follows: The juice, after being expressed from the cane by any well-known means, is collected in a tank of suitable size, holding, generally, about a thousand gallons. To it is added a mixture which is prepared in the following manner: Fresh quicklime is slaked with water, so that the resulting mixture has the consistence of a thick cream, which is conducted into a vat or reservoir. In this vat is arranged a shaft provided with radial arms, which carry beaters or paddles, and means are provided for rotating said shaft in the vat. Said vat, by means of a flue or passage entering at its upper portion, communicates with a furnace suitably constructed for burning sulphur, so that by means of said connecting-passage the sulphurous-acid gas, resulting from the combustion of the sulphur, is led into the upper portion of the vat and above the cream of lime therein. Suitable means are provided for drawing in said fumes, so that a constant current of sulphurous-acid gas is caused to enter the vat. The shaft and beaters being set in rotation, the liquid contents of the vat are violently agitated, and at the same time the sulphurous-acid gas is beaten into and caused to mingle with the same. The process of mixing the gas and cream of lime is continued until the liquid assumes a clear yellow color and gives, when tested with litmus test-paper, a strongly-acid reaction. This acid reaction is essential. The liquid also has a clearly-perceptible sulphurous smell. The exact length of time for beating and passage of sulphurous-acid gas in the cream of lime cannot definitely be stated; but for all practical purposes it will be sufficient if the liquor presents the characteristics before stated, when it will be ready for use. It is preferable to make the cream of lime of as thick a consistence as possible, while at the same time not so thick as will prevent the free working of the beaters. It will be noticed, also, that shortly before the cream of lime becomes impregnated with sulphurous-acid gas, so as to reach the condition before described, its temperature becomes considerably elevated, to a degree almost enough to scald the naked hand. After the liquid reaches the before-stated condition, further continuation of the process depends upon the state of the cane-juice to be treated. Thus, if the juice is pressed from frost-bitten, soured, or otherwise damaged cane, so that the juice is more than normally sour, it is advisable to continue the impregnation of the cream of lime for from ten to twenty minutes longer, or, generally, to bring the liquor to a higher degree of concentration, strength, and acidity. The apparatus before set forth for combining the lime and sulphurous-acid gas, I do not claim in this application, inasmuch as the same forms the subject of a separate application filed herewith, to which reference is made for details of the mechanism.

I desire to call especial attention to the fact that the above-named substance, to which I have given the name of "sulphureted cream of lime," is in fact not bisulphite of lime, but is probably a combination of bisulphite, hyposulphite, and pentasulphite of lime, or, in fact, all possible sulphites, inasmuch as it is made by the saturation of cream of lime with sulphurous acid up to and beyond the satisfaction of all chemical affinities. It must, when first made and in best condition for use, show the yellow color before mentioned, and give off fumes of sulphurous-acid gas.

I am aware that bisulphite of lime has been used for defecating sugar-juice, and that various processes of defecation are in existence depending upon the use of that material. I desire to disclaim any and all processes of sugar defecation which depend upon the addition of bisulphite of lime only to the liquor to be treated.

I am also aware that there are known processes of sugar defecation involving the use separately of quicklime and sulphurous acid in solution, these materials not being combined, but being successively added to the liquor. Such use or separate application of sulphurous acid and quicklime form no part of my invention, and is hereby disclaimed.

To the cane-juice collected in the tank I add such a proportion of the sulphurous acid and cream of lime, combined as before stated, as will render the contents of the tank slightly turbid. No definite proportion can be stated, nor is it necessary to do so for practical purposes. The test of turbidity is sufficient, and itself determines the amount of the mixture to be added. It is important to note, however, that the condition of the juice hastens or delays the turbid appearance. Thus, if the juice is normally neutral, a very small proportion of the mixture will render it turbid. On the other hand, if the juice is acid, the turbid condition will be delayed in some proportion to the acidity. The effect of adding the mixture to the juice is to cause a precipitation of the coloring-matters and other impurities, excepting the mucilage or gum. This effect is best produced when the mixture is used immediately after production, as it should be. The mixture deteriorates if allowed to stand in air. If it is necessary to keep the mixture for any length of time, it should be hermetically sealed up in an air-tight vessel with a solution of sulphurous acid in water over the top of the liquid, on which it will float. The precipitation takes place immediately, and the juice may be at once pumped or otherwise removed from the tank to the defecators, where it is heated and the scum is removed in the usual way. The principal defecation of course takes place in the tank, as already described, and a still further defecation occurs through the action of heat in the defecating-vessels. From the defecators the juice goes to the evaporators, thence to the vacuum-pans, then to the coolers or mixers, and finally to the centrifugal machine, the course of the juice after leaving the defecators being the same as it ordinarily follows when known processes of defecation are employed. In order to remove the sulphurous flavor of the sirup which comes from the centrifugal machine, I find it advantageous to collect said sirup in a suitable tank provided with perforated steam-pipes, through which live steam is injected into the sirup. This injection of steam is continued until the sulphur taste is no longer apparent. The sugar resulting from this process contains considerable of the natural gum, and, although quite light in color, has a small grain and is not easy to purge in the centrifugal machine. It is, however, an excellent marketable product, and gives a high polariscopic test.

Returning, now, to the defecated juice in the tank, I find that a somewhat better sugar may be produced by continuing the process in the following way: I prepare a weak solution of sulphuric acid—preferably about one volume of acid to four volumes of water. I do not limit myself to sulphuric acid, as I have found that other acids—notably hydrochloric and acetic acids, when in a weak solution—will accomplish substantially the same result. It is desirable, however, that the strength of the acid solution should not be greater than is indicated by the proportions of sulphuric acid and water before stated. This acid solution is to be added to the defecated juice in the tank—preferably in the proportion of five hundred cubic centimeters of acid solution to one thousand gallons of juice. I have found this proportion to work well with sorghum-juice. It can be exceeded, probably, to a considerable extent without danger, though with no perceptible advantage in results. Care, however, is to be taken not to add too much of the acid solution, as the consequence might be to invert the sugar. The effect of the acid solution upon the defecated juice is to throw down the gum or mucilage, some of which is actually precipitated immediately, and all eventually, if the juice is allowed to stand long enough for the light flocculent material to gravitate to the bottom. The success of the operation is at once manifested by the rising of sulphurous fumes from the juice, the odor of which is plainly perceptible.

As the deposition of the light mucilaginous material requires some delay, it is better, in order to save time, to separate it out by means of a filter-press of any suitable construction, from which the filtered juice emerges clear. It will be seen that this process gives a cold defecation, and thus accomplishes a result of great value and importance. A slightly-better grade of sugar can be made, however, by conducting the juice to the defecating-vessels and there warming it nearly to the boiling-point before passing it through the filter-press; but this warming of the juice is not essential to the production of excellent sugar by the aid of my process, as described.

In the cold process, as I have described it, the juice passes from the filter-presses directly to the vacuum-pan, thus entirely dispensing with defecators and clarifiers. Care, however, must be taken that the filter-press is properly worked, and that none of the scum is allowed to mingle with the juice. In the warm process the juice passes, as already stated, from the defecators to the filter-press, and thence to the clarifiers. So far as the relative advantages of the two processes are concerned, the cold process requires greater care in operation and produces almost if not equally as good a grade of sugar, and does away with defecating and clarifying vessels and the skilled labor and expenses attendant upon their use. The warm process, on the other hand, requires less care in its general operation, but involves the use of defecators and clarifiers to compensate for such lack of care, and produces a grade of sugar, which a very experienced eye only would class as of better grade than that made by the cold process. When treated by either process, the course of the juice after leaving the vacuum-pan is the same as already set forth. The resulting sugar is free from gum, or very nearly so, and is generally of considerably better quality, both in grain, color, and test, than that made without the use of the weak acid solution.

An important advantage of my invention is as follows: It is well known that cane-juice, after being expressed, will ferment in a very short time, and inversion of the sugar is the result, so that it is available only for the manufacture of alcohol or poor molasses. After the juice is treated with the sulphureted-lime mixture and the acid solution, as I have before described, it will remain unchanged, and no fermentation will take place as long as the sulphurous-acid fumes continue to be emitted from it, whether it be exposed to the air or not. I have kept such juice exposed to the air in a warm room for three months without detecting perceptible deterioration in it.

The foregoing process I have described as I have practically applied it to the juice of the sorghum-plant, the crop being raised in the State of New Jersey. I have found it to be applicable equally well to the ordinary sugar-cane and to the manufacture of molasses sugars from molasses imported from the West India Islands. It is equally applicable to the improvement of any raw sugars, these being dissolved in water prior to the addition of the lime mixture and acid solution.

It will be observed from the foregoing that in the processes described the liquor remains acid—that is, gives an acid reaction to the test-paper throughout—and in this respect the said processes differ materially from ordinary lime or lime and sulphur processes wherein the liquor is kept neutral. This acidity I remove, either wholly or in great measure, by the boiling of the liquor in the evaporators and vacuum-pans.

I claim as my invention—

1. The defecating compound or mixture for saccharine liquors herein particularly set forth, consisting of cream of lime and sulphurous acid mingled and combined till the said cream of lime is completely saturated with sulphurous acid, substantially as described.

2. The process herein set forth of defecating saccharine liquors, consisting in adding to the juice the sulphureted cream-of-lime compound herein set forth prior to heating the same in defecating-vessels, substantially as described.

3. The process of defecating saccharine liquors, consisting in, first, adding to the juice the sulphureted cream-of-lime compound herein set forth, and, second, a dilute aqueous solution of acid, substantially as described.

4. The process of defecating and clarifying saccharine liquors as herein set forth, of, first, adding to the juice the sulphureted cream-of-lime compound herein set forth, and afterward a dilute aqueous solution of acid, and then filtering the juice while cold, substantially as described.

5. The process of defecating and clarifying saccharine liquors as herein set forth, consisting in, first, adding the sulphureted cream-of-lime compound herein set forth to the juice, and, second, a dilute aqueous solution of acid, and then heating said juice in defecating-vessels, and finally filtering the same, substantially as described.

6. The method of delaying fermentation in saccharine liquors, consisting in adding to said liquors, first, the sulphureted cream-of-lime compound herein set forth, and, second, a dilute aqueous solution of acid, substantially as described.

7. The process herein set forth of removing the sulphurous taste or odor of sirups defecated by a sulphur process, consisting in injecting live steam in said sirups, substantially as described.

8. The process of defecating and clarifying saccharine liquors, consisting in adding to said liquor an acid solution or solutions, whereby said liquor is rendered acid, and finally removing said acidity, either wholly or in great part, by boiling the liquor, substantially as described.

HENRY ALBERT HUGHES.

Witnesses:
GEORGE BIDDLE,
J. RODMAN PAUL.